(No Model.)
F. W. WIESEBROCK.
PRESERVING BREWERS' GRAIN.
No. 312,593. Patented Feb. 17, 1885.
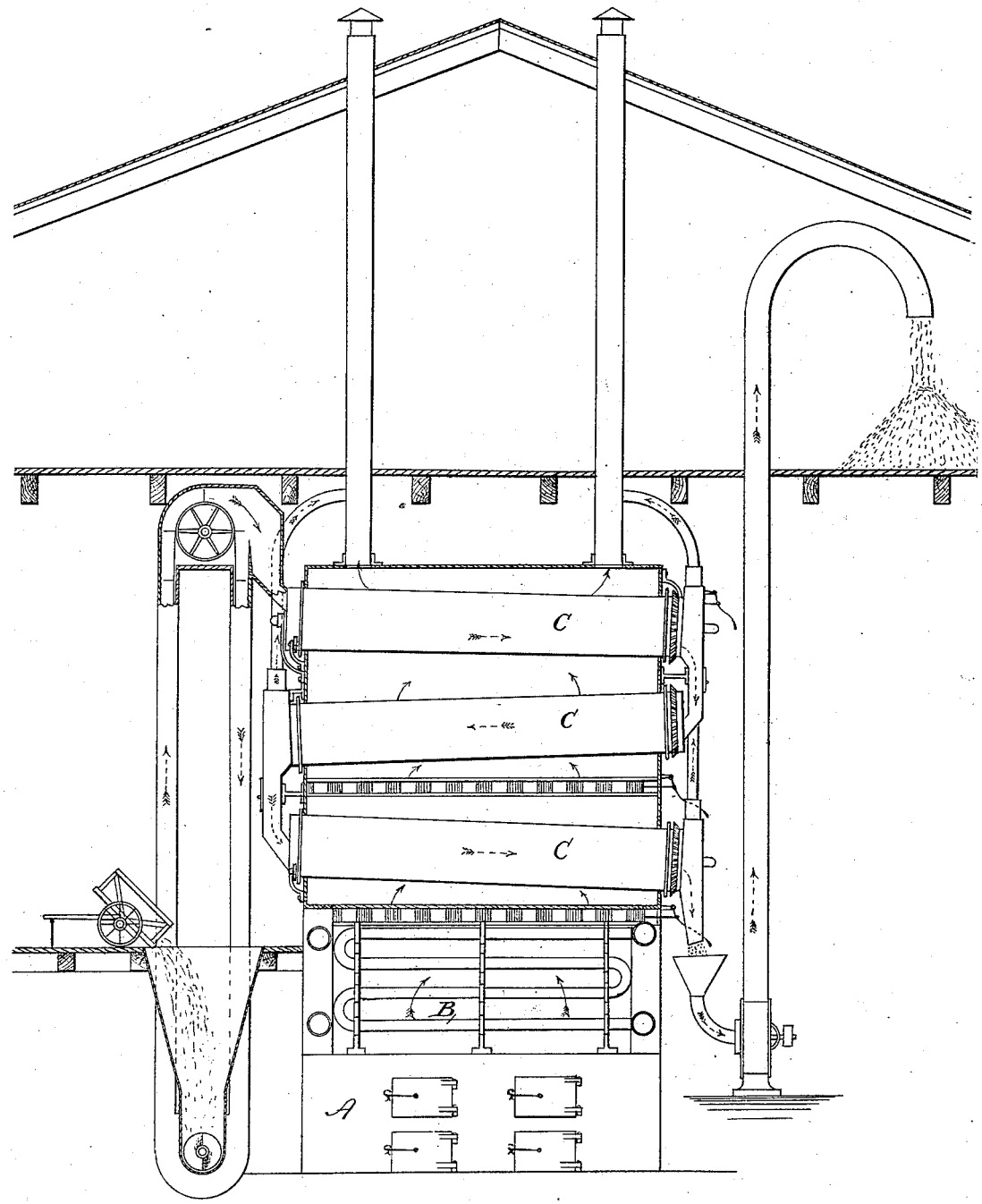
Witnesses:
T. C. Brecht
W. D. Jones
Inventor:
Fred. W. Wiesebrock,
By James L. Norris
Attorney.

UNITED STATES PATENT OFFICE.

FREDERICK W. WIESEBROCK, OF NEW YORK, N. Y., ASSIGNOR OF TWO-THIRDS TO SAMUEL C. SHAEFFER, OF LANCASTER, OHIO.

PRESERVING BREWERS' GRAIN.

SPECIFICATION forming part of Letters Patent No. 312,593, dated February 17, 1885.

Application filed July 18, 1884. (No model.)

*To all whom it may concern:*

Be it known that I, FREDERICK W. WIESEBROCK, a citizen of the United States, residing at New York city, New York, have invented new and useful Improvements in Processes of Treating Refuse from Starch and Glucose Factories and Brewers' Grain, of which the following is a specification.

This invention has for its object the treatment of offal from breweries, and starch and glucose factories, containing carbohydrates and alluminates, so as to retain the nutritious qualites thereof without permitting the injurious formation of lactic and other acids, the product being particularly suitable as a wholesome and nourishing horse and cattle food.

Brewers' grain, as well as the refuse from starch and glucose factories, is well known to be a valuable cattle-fodder, and would be a wholesome food if it could be fed in a fresh state; but since the location of such factories is generally in large cities, and hence remote from the milk-producing districts, except those within a limited radius of the factories, the refuse materials obtained from the latter usually reach the cattle to be fed with them in a fermented or decomposed state.

Various means have been devised to dry brewers' grain and refuse materials from glucose factories with the view of retaining the nutritious properties thereof; but heretofore they have failed to produce a wholesome and sweet dry article of food. This fact is attributable to the susceptability of the material to sour fermentation when atmospheric air not freed of its fermentation-sustaining germ is allowed to come in contact with it during the drying process, which when permitted results in the production of an article containing a considerable proportion of lactic acid in the dry state, and which for that reason is not much better or more desirable than the same material containing the lactic acid in a wet state.

In order to secure a wholesome, sweet, and nutritious dry article of food from the materials derived from the above-named sources, I first mix a sufficient percentage of salt or salt-water with the wet brewers' grain or refuse material, (say about three to five pounds of salt to a ton of the wet material,) in order to keep the latter sweet and fresh during the transit from the source of its production to the drying apparatus. I then introduce the wet salted grain into a drying apparatus, which is constructed to exclude all air therefrom, except such as has previously been purified or freed from its fermentation-sustaining germ. I eliminate said germ from the air by heating it to a temperature that destroys the same, say, to a temperature of 400° Fahrenheit, and above, after which the heated air is introduced under pressure into the kiln or chamber containing the wet material, so that the pressure maintained within said chamber will be greater than the external atmospheric pressure, which results in the exclusion of the outer air that has not been heated and purified. The material is subjected to the action of the purified and heated air for a sufficient period of time to thoroughly dry the same, and it is agitated during the performance of the drying operation, and the moisture or vapors evolved are carried off through suitable escape-flues. The most favorable temperatures for producing sour fermentation in starch and glucose residues and brewers' grain are from 100° to 200° Fahrenheit when in contact with the atmosphere. Where steam heat has been employed to dry the materials, the temperature has not been high enough to destroy the germ in the air, and when dry heat was used the contact of air at a temperature too low to destroy the germ was not excluded from contact with the grain or materials, and hence the material was exposed to temperatures that had an injurious influence, and a sour product was the result. By my method, however, as above described the product is preserved in a sweet and wholesome state, and the nutritious properties of the materials are retained.

In order to set forth more fully the manner of carrying out my process, I have illustrated an apparatus which is used for obtaining the dry product mentioned. This apparatus comprises a furnace-chamber or kiln, A, in which are arranged flues B, for heating atmospheric air to the high temperature required for the proper carrying out of my process. Above the furnace-chamber are arranged rotary cylinders C, through which the material is conducted and dried while in transitu. These cylinders are connected with each other, the lower end of the uppermost cylinder delivering the material into the upper end of the cylinder arranged immediately below the same, and so on to the bottom of the series. Two parallel series of cylinders are used, and means are resorted to for elevating the material from the bottom cylinder of one series to the top cylinder of the other series. The cylinders contain agitating and retarding devices, and have means for distributing the highly-heated air into the mass of material traveling through the same.

In addition to being treated internally by superheated air, the fire-gases from the furnace come in contact with the outside of the cylinders. This results in the exposure of the materials to air that is entirely devoid of its fermentation producing or sustaining germ. The vapors or moisture evolved in the drying-cylinders is forced out by suitable flues by the incoming heated air, and as the latter is admitted under pressure, being forced through the heating-tubes by a blower, it is evident that the external atmospheric air cannot enter through the exhaust or vapor discharge flues.

The apparatus shown in the present instance for carrying out my drying process forms the subject-matter of a former application for patent, filed on the 31st day of January, 1884, Serial No. 119,326.

I am aware of the existence of British Patent No. 2,898, granted A. D. 1865, for treating brewers' grains in order to render them more suitable for the food of animals, and I disclaim everything set forth in said patent, since I make no broad claim to drying brewers' grains with heated air applied otherwise than at a temperature at or about 400° Fahrenheit, which is the point at which the destruction of the fermentation-inducing germs can take place.

I also make no claim to adding salt to dried brewers' grain, but use salt or a brine solution for the object heretofore stated.

Having thus described my invention, what I claim is—

1. The process of treating refuse from starch and glucose factories and breweries, consisting in first applying an antiseptic thereto and then drying by forced currents of air heated to a high temperature, substantially as set forth.

2. The process of treating refuse from starch and glucose factories and brewers' grains consisting in subjecting the same when in wet or fresh state to a salting operation for the object set forth, then exposing the same in a close chamber from which the ordinary atmospheric air is excluded to the action of forced currents of air heated to a temperature ranging at or above 400° Fahrenheit, and expelling the vapors evolved in the drying-chamber by such forced currents of superheated air, substantially as described.

In testimony whereof I affix my signature in presence of two witnesses.

F. W. WIESEBROCK.

Witnesses:
JAMES L. NORRIS,
JOS. L. COOMBS.